(12) United States Patent
Zlotnick et al.

(10) Patent No.: US 9,952,084 B2
(45) Date of Patent: Apr. 24, 2018

(54) INCREASING SIGNAL TO NOISE RATIO OF ACOUSTIC ECHOES BY A GROUP OF SPACED APART ACOUSTIC TRANSCEIVER ARRAYS

(71) Applicant: A.P.M. AUTOMATION SOLUTIONS LTD., Tel Aviv (IL)

(72) Inventors: Yossi Zlotnick, Ramat-Hasharon (IL); Avishai Bartov, Hod-Hasharon (IL)

(73) Assignee: APM AUTOMATION SOLUTIONS LTD, Tel Aviv (IL)

( * ) Notice: Subject to any disclaimer, the term of this patent is extended or adjusted under 35 U.S.C. 154(b) by 873 days.

(21) Appl. No.: 14/050,387

(22) Filed: Oct. 10, 2013

(65) Prior Publication Data

US 2015/0103630 A1  Apr. 16, 2015

(51) Int. Cl.
  *G01S 15/00* (2006.01)
  *G01F 23/296* (2006.01)
  *G01F 22/00* (2006.01)

(52) U.S. Cl.
  CPC .......... *G01F 23/2966* (2013.01); *G01F 22/00* (2013.01)

(58) Field of Classification Search
  None
  See application file for complete search history.

(56) References Cited

U.S. PATENT DOCUMENTS

| | | | | |
|---|---|---|---|---|
| 4,481,517 A | * | 11/1984 | Brown | G01J 9/02 342/201 |
| 5,067,817 A | * | 11/1991 | Glenn | G01B 11/24 356/613 |
| 5,131,271 A | * | 7/1992 | Haynes | G01F 23/2962 181/124 |
| 5,337,289 A | * | 8/1994 | Fasching | G01F 23/2962 340/612 |

(Continued)

FOREIGN PATENT DOCUMENTS

| | | | | |
|---|---|---|---|---|
| CA | 2759068 | | 2/2005 | |
| DE | 19860901 A1 | * | 7/2000 | G01F 23/0076 |

(Continued)

OTHER PUBLICATIONS

Pallav, P., David A. Hutchins, and T. H. Gan. "Air-coupled ultrasonic evaluation of food materials." Ultrasonics 49.2 (2009): 244-253.*

(Continued)

*Primary Examiner* — Isam A Alsomiri
*Assistant Examiner* — Jonathan D Armstrong
(74) *Attorney, Agent, or Firm* — Reches Patents

(57) ABSTRACT

A method and a system for evaluating a content of a bin, the method may include: transmitting by multiple acoustic transceiver arrays, a plurality of acoustics pulses in an at least partially overlapping manner towards an expected location of the content to generate an acoustic interference pattern that comprises multiple fringes; detecting by an acoustic transceiver array a first fringe of the acoustic (Continued)

interference pattern and providing a fringe detection signal; and processing the first fringe detection signal to assist in a provision of a first estimate related to the content. A distance between a pair of acoustic transceiver arrays is at least ten times a distance between transducers of a same acoustic transceiver array.

20 Claims, 12 Drawing Sheets

(56) References Cited

U.S. PATENT DOCUMENTS

| | | | | |
|---|---|---|---|---|
| 5,474,072 | A | * | 12/1995 | Shmulewitz ............ A61B 6/502 |
| | | | | 128/915 |
| 5,619,423 | A | * | 4/1997 | Scrantz .............. G01N 29/2412 |
| | | | | 324/220 |
| 6,055,214 | A | * | 4/2000 | Wilk ........................ G01S 7/521 |
| | | | | 367/99 |
| 6,282,526 | B1 | * | 8/2001 | Ganesh .................... G06N 7/02 |
| | | | | 342/13 |
| 6,581,459 | B1 | | 6/2003 | Lichtenfels, II |
| 6,634,234 | B1 | * | 10/2003 | Haas ...................... G01F 23/284 |
| | | | | 367/138 |
| 6,986,294 | B2 | | 1/2006 | Fromme et al. |
| 6,987,707 | B2 | * | 1/2006 | Feintuch ................. G01S 15/04 |
| | | | | 367/87 |
| 8,040,272 | B1 | | 10/2011 | Clodfelter et al. |
| 8,611,187 | B2 | * | 12/2013 | Bis ......................... E21F 17/18 |
| | | | | 340/870.07 |
| 2004/0143176 | A1 | * | 7/2004 | Foxlin .................. G01C 21/165 |
| | | | | 600/395 |
| 2004/0173021 | A1 | | 9/2004 | Lizon |
| 2007/0159924 | A1 | * | 7/2007 | Vook ......................... G01S 5/28 |
| | | | | 367/127 |
| 2009/0007627 | A1 | * | 1/2009 | Perl ...................... G01F 23/2962 |
| | | | | 73/1.73 |
| 2012/0155584 | A1 | * | 6/2012 | Wilkinson ............... G04G 7/00 |
| | | | | 375/354 |
| 2012/0287749 | A1 | * | 11/2012 | Kutlik .................... G01H 3/125 |
| | | | | 367/7 |
| 2014/0207412 | A1 | | 7/2014 | Bartov |

FOREIGN PATENT DOCUMENTS

| | | | | |
|---|---|---|---|---|
| DE | 10106176 | | 8/2002 | |
| EP | 0159187 | A2 * | 10/1985 | ............ G01B 11/002 |
| EP | 0310564 | A1 * | 4/1989 | .............. G01F 23/28 |
| EP | 0938837 | A1 * | 9/1999 | .............. A01D 33/10 |
| JP | S6022624 | | 2/1985 | |
| JP | 2001330500 | | 11/2001 | |
| JP | 2008304320 | | 12/2008 | |
| KR | 20020016008 | | 3/2002 | |
| WO | WO0160718 | | 8/2001 | |
| WO | WO 0160718 | A2 * | 8/2001 | ............. G01B 11/24 |
| WO | WO 03079047 | A2 * | 9/2003 | ......... G01S 7/52047 |
| WO | WO 2006090394 | A2 * | 8/2006 | ......... G01F 23/2962 |
| WO | WO2007077079 | | 7/2007 | |
| WO | WO 2015052698 | A1 * | 4/2015 | ........... G01F 23/296 |

OTHER PUBLICATIONS

Tamai, Yuki, et al. "Sound spot generation by 128-channel surrounded speaker array." Sensor Array and Multichannel Signal Processing Workshop Proceedings, 2004. IEEE, 2004.*
Gan, Tat Hean, Prakash Pallav, and David A. Hutchins. "Non-contact ultrasonic quality measurements of food products." Journal of Food Engineering 77.2 (2006): 239-247.*
Flanagan, J. L., et al. "Computer-steered microphone arrays for sound transduction in large rooms." The Journal of the Acoustical Society of America 78.5 (1985): 1508-1518.*
Pollow, Martin, Gottfried Behler, and Bruno Masiero. "Measuring directivities of natural sound sources with a spherical microphone array." Proceedings of the 1st Ambisonics Symposium Graz. 2009.*
Lokki, Tapio, et al. "Concert hall acoustics assessment with individually elicited attributes." The Journal of the Acoustical Society of America 130.2 (2011): 835-849.*
Fink, Mathias, et al. "Time-reversed acoustics." Reports on progress in Physics 63.12 (2000): 1933.*
EP 1853881 A4. European Search Report for Application EP 06 71 1242. dated Jul. 29, 2009.*
Bulusu, Nirupama, et al. "Scalable, ad hoc deployable rf-based localization." Proceedings of the Grace Hopper Conference on Celebration of Women in Computing. vol. 31. 2002.*
Barshan, Billur, and Deniz Baskent. "Comparison of two methods of surface profile extraction from multiple ultrasonic range measurements." Measurement Science and Technology 11.6 (2000): 833.*
Barshan, Billur. "Directional processing of ultrasonic arc maps and its comparison with existing techniques." The International Journal of Robotics Research 26.8 (2007): 797-820.*
Caicedo, David, and Ashish Pandharipande. "Distributed ultrasonic zoned presence sensing system." IEEE Sensors Journal 14.1 (2013): 234-243.*
NDT Resource Center. Ultrasonic Formula. URL: [https://www.nde-ed.org/GeneralResources/Formula/UTFormula/ultrasonicPrint.pdf]. Retrieved Mar. 24, 2017. 2003.*
Terzic, Jenny, et al. Ultrasonic fluid quantity measurement in dynamic vehicular applications. Springer Science & Business Media, Jun. 14, 2013.*

* cited by examiner

INCREASING SIGNAL TO NOISE RATIO OF ACOUSTIC ECHOES BY A GROUP OF SPACED APART ACOUSTIC TRANSCEIVER ARRAYS

BACKGROUND OF THE INVENTION

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arise from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors have a single point of measurement that is not suited for bulk solids.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin and especially detect obstacles and would overcome the disadvantages of presently known methods as described above.

SUMMARY OF THE INVENTION

There are provided systems and methods for evaluating a content of a bin.

According to an embodiment of the invention there may be provided a method for evaluating a content of a bin, the method may include transmitting by multiple acoustic transceiver arrays, a plurality of acoustics pulses in an at least partially overlapping manner towards an expected location of the content to generate an acoustic interference pattern that comprises multiple fringes; detecting by an acoustic transceiver array a first fringe of the acoustic interference pattern and providing a fringe detection signal; and processing the first fringe detection signal to assist in a provision of a first estimate related to the content. A distance between a pair of acoustic transceiver arrays is at least ten times a distance between transducers of a same acoustic transceiver array.

The method may include detecting by each one of the multiple acoustic transceiver arrays fringes of the acoustic interference pattern to provide fringe detection signals and processing the fringe detection signals to provide a second estimate related to the content.

The method may include compensating for clock differences between a second clock of the second acoustic transceiver array and a master clock.

The compensating may include receiving multiple master clock time stamps; determining a compensated value of an acoustic transceiver array clock time stamp in response to values of the multiple master clock time stamps and timings of receiving of the multiple master clock time stamps; and setting the acoustic transceiver array clock to the compensated value.

The compensating may include calculating by each acoustic transceiver array a gap between a rate of the acoustic transceiver array clock and a rate of the master clock in response to the multiple master clock time stamps and in response to the timings of the receiving of the multiple master clock stamps.

An upper surface of the content may be expected to be located within a far field of each one of the acoustic transceiver arrays.

Each acoustic pulse may have a shape of a lobe that is more that forty degrees wide.

The method may include switching to a partial transmission mode during which only a part of the multiple acoustic transceiver arrays transmit acoustics pulses in an at least the partially overlapping manner towards the expected location of the content.

The method may include determining to switch to the partial transmission mode if determining that a signal to noise ratio that can be obtained by transmitting acoustic pulses by only a part of the multiple acoustic transceiver arrays exceeds a minimum signal to noise ratio.

According to an embodiment of the invention there may be provided a system that may include multiple acoustic transceiver arrays that are arrange to transmit a plurality of acoustics pulses in an at least partially overlapping manner towards an expected location of the content to generate an acoustic interference pattern that may include multiple fringes; wherein at least one of the acoustic transceiver arrays of the multiple acoustic transceiver arrays may be arranged to detect a first fringe of the acoustic interference pattern and providing a fringe detection signal; and process the first fringe detection signal to assist in a provision of a first estimate related to the content. A distance between a pair of acoustic transceiver arrays is at least ten times a distance between transducers of a same acoustic transceiver array.

The multiple acoustic transceiver arrays may be arranged to detect fringes of the acoustic interference pattern to provide fringe detection signals and to process the fringe detection signals to provide a second estimate related to the content.

Each acoustic transceiver array may be arranged to compensate for clock differences between a clock of the acoustic transceiver array and a master clock.

Each acoustic transceiver array may be arranged to determine a compensated value of an acoustic transceiver array clock time stamp in response to values of the multiple master clock time stamps and timings of receiving of the multiple master clock time stamps; and set the acoustic transceiver array clock to the compensated value.

Each acoustic transceiver array may be arranged to calculate a gap between a rate of the master clock and a rate of the acoustic transceiver array clock in response to the multiple master clock time stamps and in response to the timings of the receiving of the multiple master clock stamps.

An upper surface of the content may be expected to be located within a far field of each one of the acoustic transceiver arrays.

Each acoustic pulse may have a shape of a lobe that may be more than twenty, degrees, thirty degrees, forty degrees and the like wide.

Each acoustic transceiver array may be arranged to switch to a partial transmission mode during which only a part of the multiple acoustic transceiver arrays transmit acoustics pulses in an at least the partially overlapping manner towards the expected location of the content.

At least one acoustic transceiver array may be arranged to determine to switch to the partial transmission mode if a signal to noise ratio that can be obtained by transmitting acoustic pulses by only a part of the multiple acoustic transceiver arrays exceeds a minimum signal to noise ratio.

The system may include a controller that may be arranged to receive the first and second estimates related to the content and to provide an updated estimate related to the content.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
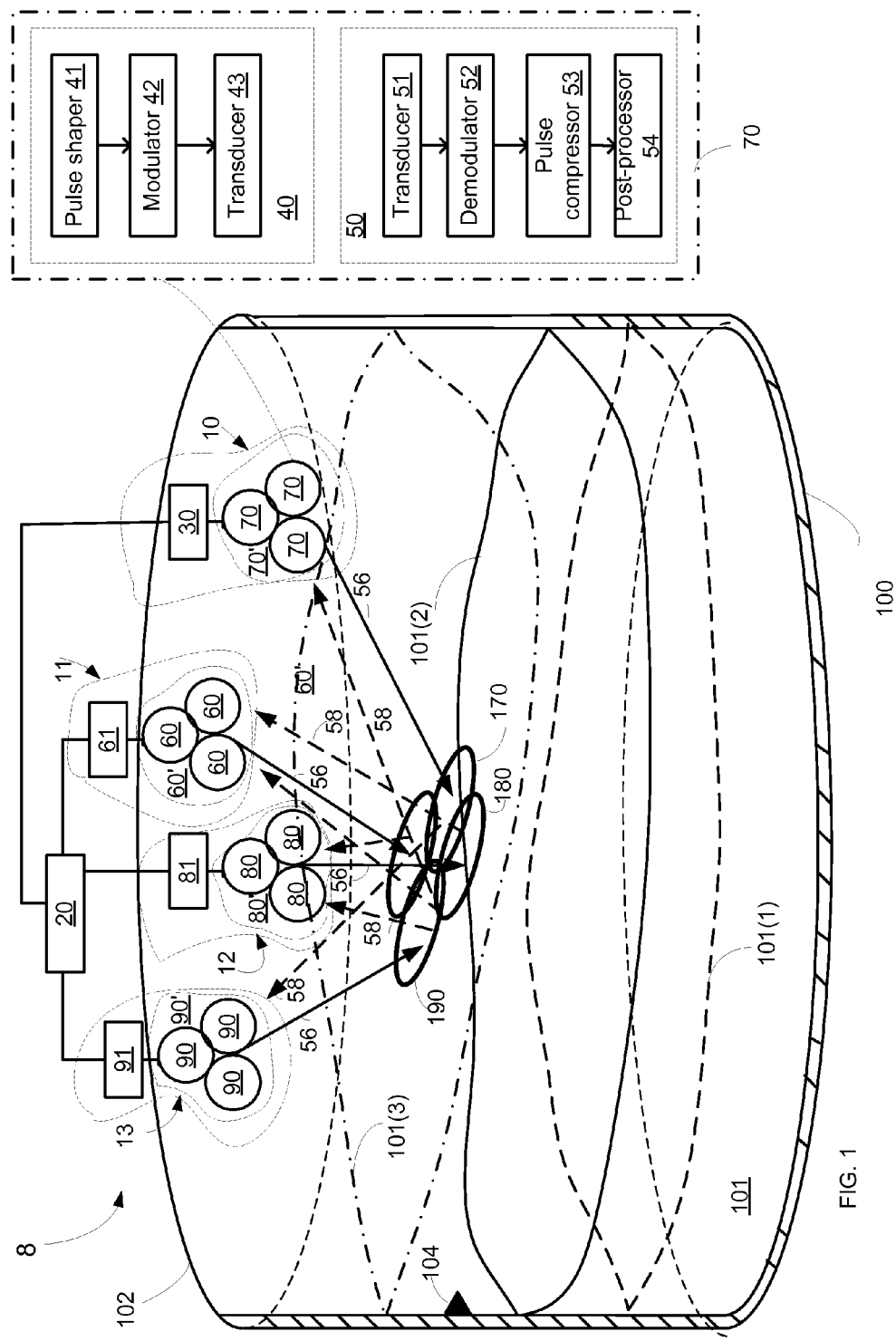
FIG. 1 is a partially cut-away view of a silo with a system mounted on the ceiling of the silo according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

There are provided systems and methods for measuring a content of a bin. Interference patterns are formed at the vicinity of the upper surface of the content of the bin by transmitting acoustic pulses by different acoustic transceiver arrays in parallel. Fringes represent locations of constructive interference in which the strength of the echo exceeds the strength of an echo generated from a transmission of a single acoustic pulse at a time.

The present invention is of a system for providing an estimate relating to the content stored in a bin. The estimate can relate to the quantity of the content, the distribution of the content within the bin and the like.

The principles and operation of content measuring according to the present invention may be better understood with reference to the drawings and the accompanying description.

The system includes two or more spaced apart acoustic transceiver arrays. The acoustic transceiver arrays are spaced apart in the sense that they receive echoes from the same reflecting point at substantially different angles. These angles may differ from each other by multiple degrees (for example by at least ten, twenty, thirty or more degrees) and not by a fraction of a degree. The distance between spaced apart acoustic transceiver arrays can be few meters and the distance between each acoustic transceiver array and the content of the bin can also be few meters.

An acoustic pulse can be directed towards a location in which there may be expected to be content at least at a certain fullness level of the bin. The change in the fullness level does not change the direction of illumination that may be fixed. Thus when the content level changes the direction of transmission does not change. In various figures it may be assumed that the acoustic pulse is directed at a certain direction that causes the acoustic pulse to be directed towards the upper surface of a content of the bin.

The difference between these angles is large enough so that there may be cases that echoes of the same acoustic pulse will be collected by only some of the acoustic transceiver arrays.

Figure 3:
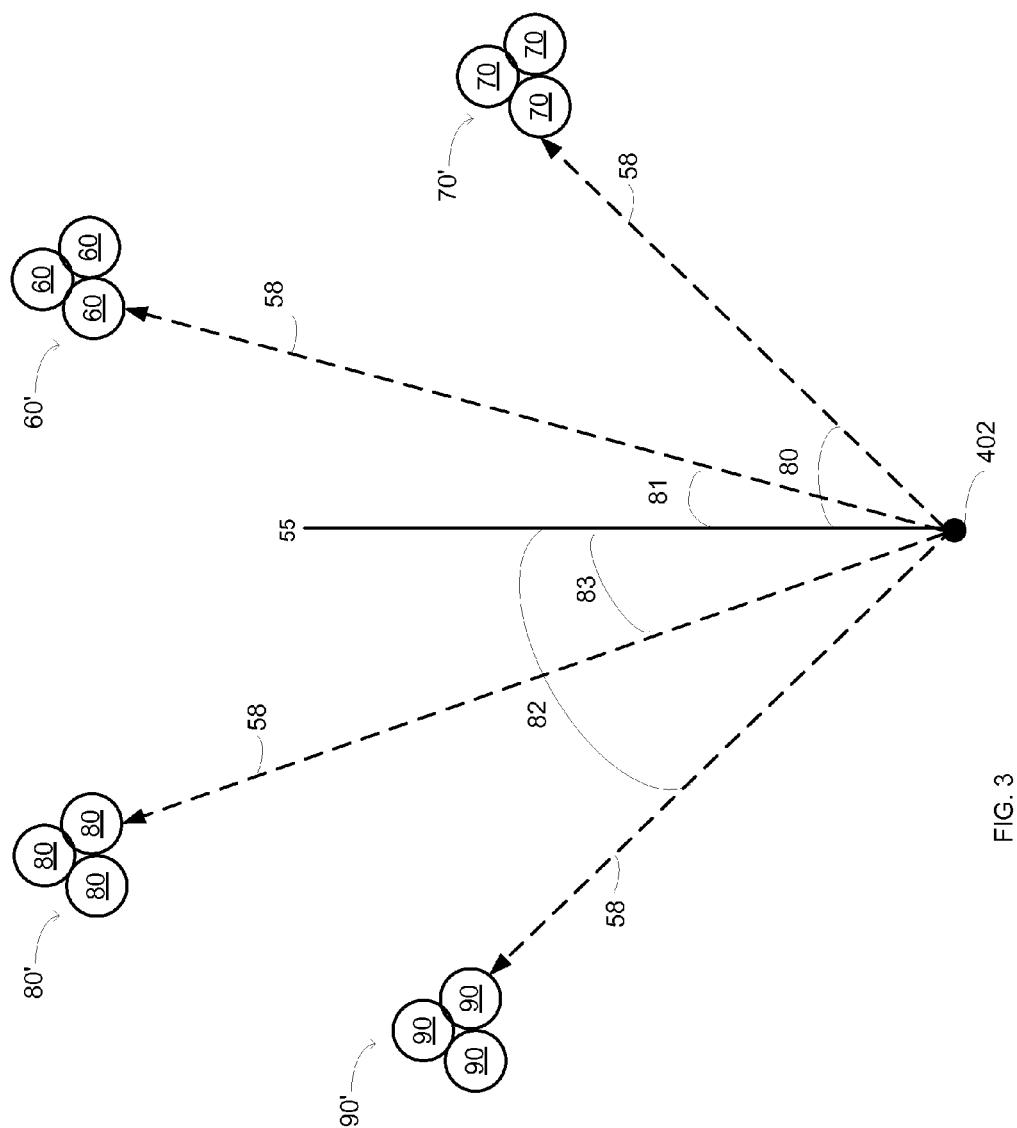
FIG. 3. illustrates the spatial relationships between the center of the collection fields of different transceiver arrays of the system of FIG. 1 according to an embodiment of the invention.

FIG. 3 illustrates angles 80, 81, 82 and 83 formed between an imaginary vertical line 55 extending from a reflecting point of an upper surface of a content of a bin and between four acoustic transducers arrays 70', 60', 80' and 90' that includes acoustic transducers 70, 60, 80 and 90. These angles substantially differ from each other.

For example—the distance between the spaced apart acoustic transceiver arrays is at least ten times a distance between transducers of the same acoustic transceiver array.

The spaced apart acoustic transducer arrays array cannot be regarded as forming a single phased array as they are too spaced apart from each other.

The content of the bin is expected to be within the far field of each of the acoustic transducer arrays.

The systems and method may include transmitting acoustic pulses in an at least partially overlapping manner. The phrase "at least partially overlapping" means that the transmission is done in a fully overlapping manner (the transmission of all acoustic pulses starts and ends at the same time) or in a partially overlapping manner in which the transmission of one acoustic pulse only partially overlaps the transmission of another acoustic pulse. This is also referred to as parallel transmission.

Figure 4:
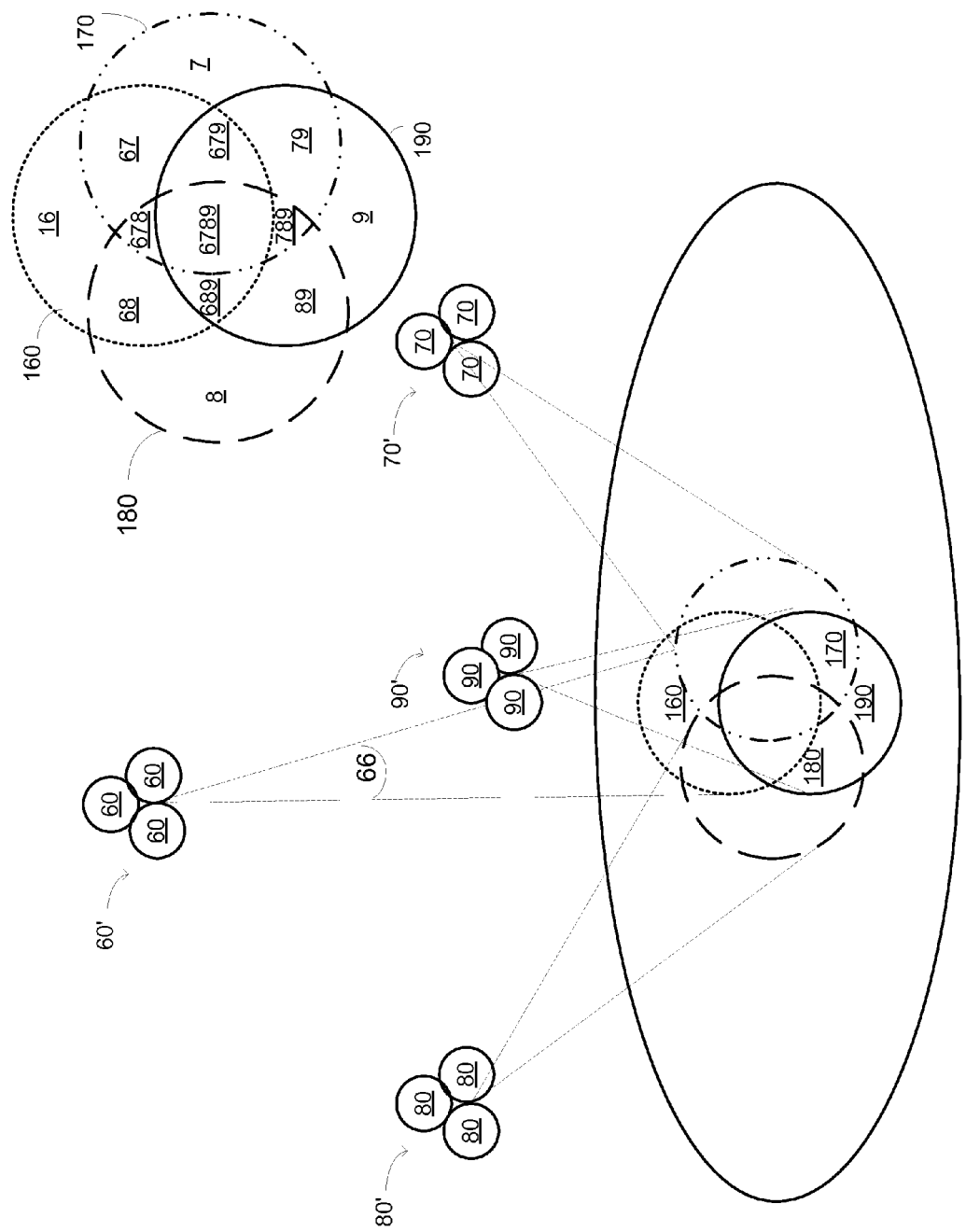
FIG. 4. illustrates the spatial relationships between the areas illuminated by different transceiver arrays of the system of FIG. 1 according to an embodiment of the invention.

The fields of view of the different spaced apart acoustic transducer at least partially overlaps—as illustrated in FIG. 4 showing fields of view 170, 160, 180 and 190 of acoustic transducer arrays 70', 60', 80' and 90', areas 6, 7, 8 and 9 in which there is no overlap and the following overlap areas:

a. Area 6789—overlap area between 160, 170, 180 and 190.
b. Area 678—overlap area between 160, 170 and 180.
c. Area 679—overlap area between 160, 170 and 190.
d. Area 689—overlap area between 160, 190 and 180.
e. Area 780—overlap area between 190, 170 and 180.
f. Area 67—overlap area between 160 and 170.
g. Area 68—overlap area between 160 and 180.
h. Area 79—overlap area between 170 and 190.
i. Area 89—overlap area between 180 and 190.

In the different overlap areas, when transmitting in parallel multiple acoustic pulses there may be formed acoustic interference patterns that have constructive and destructive interference points. It is expected that the most intense interference points will be formed in area 6789 in which acoustic pulses of all four acoustic transceiver arrays interfere and that the intensity of constructive interference points of areas 678, 679, 689 and 789 will be between those formed in areas 67, 68, 79 and 89.

When operating in parallel the interference points of area 6789 are expected to increase the signal to noise ratio by a factor of sixteen.

It is noted that the system may change its mode of operation—and change the number of acoustic transceiver arrays that transmit in parallel acoustic pulses. Thus, when there are four acoustic transceiver arrays the different mode of operation can include transmitting in parallel acoustic pulses by 1-4 acoustic transceiver arrays. The switching between modes can be done in response to events (such as changes in the quality of measurements, changes in obtained signal to noise ratio), based upon a predetermined control scheme, in a pseudo-random manner, in a random manner and the like.

The location and shape of the interference patterns (and the shape and location of the overlap areas) may change by introducing relative delays between the transmission of the acoustic pulses while maintaining a partial overlap between the pulses at the desired overlap area. The time of arrival of acoustic pulses transmitted by different acoustic transceiver arrays to the desired overlap area is calculated based upon the relative distances between the desired overlap area and each one of the acoustic transceiver arrays and the timing of transmissions of the acoustic pulses by the different acoustic transceiver arrays is calculated such as to enable at least partial overlap of pulses at the desired overlap area. Changing in the delays result in changing to the timings and this may amount to change in the location of the desired overlap area.

Figure 2:
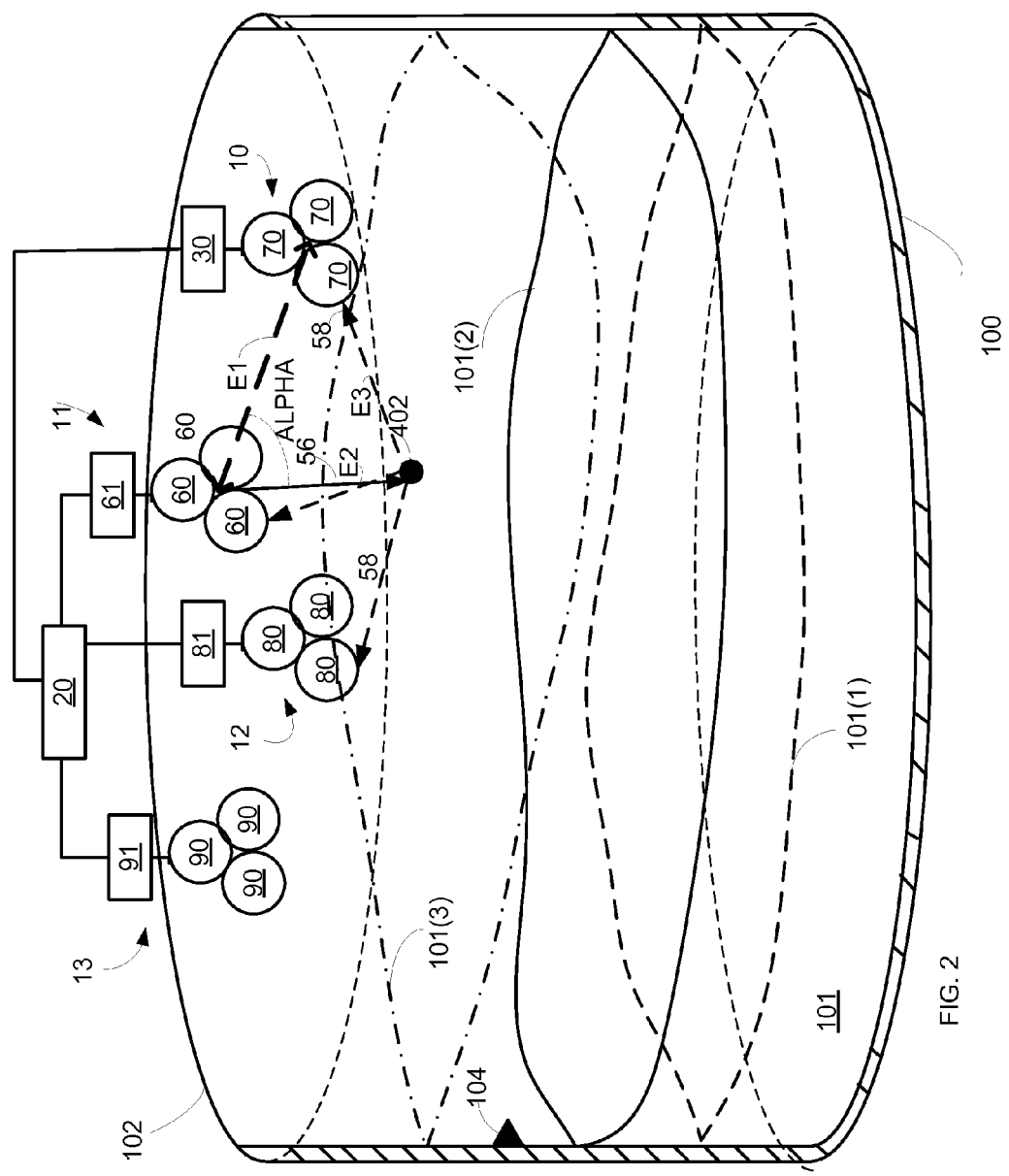
FIG. 2 is a partially cut-away view of a silo with a system mounted on the ceiling of the silo according to an embodiment of the invention.

FIGS. 1 and 2 are partially cut-away views of a silo 100 with a system 8 that includes four acoustic detection devices 10-13 and a controller 20, according to various embodiments of the invention. In FIG. 1 all four acoustic transceiver arrays of acoustic detection devices 11-14 transmit in parallel an acoustic pulse while in FIG. 2 only one acoustic transceiver array transmits an acoustic pulse.

Each detection system has a processor and an array of acoustic transducers (transceivers). Detection system 10 includes processor 71 and acoustic transducer (transceiver) array 70' that includes three acoustic transducers 70. Detection system 11 includes processor 61 and acoustic transducer array 60' that includes three acoustic transducers 60. Detection system 12 includes processor 81 and acoustic transducer array 80' that includes three acoustic transducers 80. Detection system 13 includes processor 91 and acoustic transducer array 90' that includes three acoustic transducers 90.

The processors 71, 61, 81 and 91 may be electrically connected to their corresponding acoustic transducer arrays and/or to each other via wire or via a wireless manner. The locations of the processors in relation to each other can be regarded as being less significant that the spatial relationship between the spaced apart acoustic transducer arrays. Therefore, and for brevity of explanation, the following text may refer to the locations of the acoustic transducer arrays and not to the locations of the detection systems.

It is noted that the system 8 may include multiple spaced apart acoustic transceivers and that the four acoustic transceivers of FIGS. 1-4 and 6 are only a non-limiting example of a group that includes four acoustic transceivers. The system 8 may have any number of acoustic transceivers—two acoustic transceivers or more acoustic transceivers.

Furthermore—although FIGS. 1-7 illustrate that each acoustic transceiver includes three acoustic transducers, it is noted that one or more acoustic transceiver may include another number of acoustic transceivers. The different acoustic transceiver arrays may have the same number of acoustic transceivers or may differ from each other by the number of acoustic transceivers. A non-limiting example of such acoustic transceiver arrays is illustrated in U.S. Pat. No. 8,091,421 which is incorporated herein by reference.

Additionally or alternatively, one or more acoustic transceivers may include the same acoustic transducers or may differ from each other by the size and/or shape of the acoustic transducers.

Additionally or alternatively, one or more acoustic transceivers may have the same radiation patterns or differ from each other by their radiation patterns.

In any case each one of the acoustic transceiver includes transducers with large radiation patterns. These radiation patterns are larger that corresponding laser, ultrasonic and radar pulses. The transmitted pulses may be shaped as lobes that are wider than forty, fifty, sixty, seventy and even more degrees. A non-limiting example of such an angle is provided by angle 66 of FIG. 4.

The acoustic transducer arrays of acoustic detection systems 10-13 is mounted on the ceiling 102 of silo 100 and facing an upper surface of content 80.

FIG. 1 illustrates the upper surface 101(1), 101(2) and 101(3) of the content at three points of times during a content changing process (filling content or emptying process), according to an embodiment of the invention. Upper surface 101(1) is lower than upper surface 101(2), and upper surface 101(2) is lower than upper surface 101(3).

System 8 may define the bottom of the silo 100 as a set of points that were estimated to have the lowest estimated height out of points illuminated by the system 8 over time.

System 8 may receive at least partial information about the silo—for example its dimensions—or at least its cross section dimension.

Each acoustic transceiver array (of acoustic detection systems 10-13) includes multiple (such as three) acoustic transceivers (70, 60, 80 and 90 respectively) that are proximate to each other and also includes a processor (71, 61, 81 and 91 respectively).

The controller 20 may control the transmission windows of the different acoustic transceiver arrays so that the acoustic transceiver arrays transmit acoustic pulses in an at partially overlapping manner—so acoustic pulses generate by multiple spaced apart acoustic transceiver arrays at least partially overlap in time to generate acoustic interference patterns.

Additionally or alternatively, one or more of the acoustic transceiver can control the timing of transmissions. The acoustic transceiver may apply a distributed control mechanism to determine when each acoustic transceiver transmits its acoustic pulses so that the multiple acoustic pluses are transmitted in an at least partially overlapping manner.

Each acoustic transceiver of each array includes a transmitter and a receiver. FIG. 1 illustrates acoustic detection system 10 as including processor 30 and three acoustic transceivers 70 and further instates an acoustic transceiver 70 as including receiver 50 and transmitter 40.

The transmitter 50 may be arranged to transmit pulses of acoustic energy that may might be wide enough to cover, without scanning relatively large areas of the upper surface of the content—in comparison to much narrower areas that can be covered by narrow cross section radio frequency or narrow cross section (aperture of about 10 degrees) ultrasonic waves.

It is further noted that the invention can be applicable mutatis mutandis to large (aperture of about 60-80 degrees) cross section radio frequency pulses (for example about 1 Ghz radio frequency pulses) or to scanning systems using radio frequency or scanning systems using ultrasonic waves. The pulses of acoustic energy can have a frequency between 2-7 Hertz.

It is noted that the number of transceiver arrays can differ from three.

Each acoustic transceiver array 70 may include a transmission path and a reception path. The transmission path (transmitter—denoted 40) may include a pulse shaper 41, a modulator 42 and a transducer (speaker) 43 while the reception path (receiver—denoted 50) can include a transducer (microphone) 51, a demodulator 52, a pulse compressor 53 and a post processor 54 such as those illustrated in US patent application titled "Variable length ranging and direction-finding signals constructed from beamlimited kernals and sparse spreading sequences", having a Ser. No. 13/041,461 filing date Mar. 7, 2011 which is incorporated herein by reference.

Pulse shaper 41 generates a baseband pulse from a kernel. Modulator 42 modulates a carrier wave with the baseband pulse. Transducer 43 launches modulated carrier wave, into a medium that supports propagation of the carrier wave, as a transmitted acoustic pulse 56, towards the upper surface (101(1), 101(2) and 101(3)) of the content.

An echo from a non-overlapping illumination area or a fringe of the interference patterns (both denoted 58) may be detected by acoustic transceiver arrays of acoustic transceiver 10 and by one or more transducers of acoustic transceivers (60, 80 and 90) of acoustic transceivers 11, 12 and 13 respectively. For simplicity of explanation some of the following examples will refer to the detection of an fringe.

Transducer 51 may receive fringes and/or echoes of an acoustic pulse transmitted from any acoustic transceiver array—the latter can be obtained from non-overlapping areas such as areas 6, 7, 8 or 9 of fields of view 160, 170, 180 and 190 respectively.

Demodulator 52 demodulates the echo and/or fringe to provide a received representation of the baseband pulse.

Pulse compressor 53 compresses the representation of the baseband pulse by de-convolution. The pulse compression provides a compressed pulse that is a time-shifted representation of the original kernel. Post-processor 54 applies post-processing the compressed pulse and infers the range to a point of the upper surface (101(1), 101(2) and 101(3)) as one-half of the product of the round-trip travel time of acoustic pulse 56 and echo 58 and the propagation speed of signals 34 and 36 in medium 30.

According to another embodiment of the invention the processing is only partially done by the acoustic detection devices and it is at least partially done by controller 20. Controller 20 can merge information received from different acoustic detection devices 10-13 to provide a better estimate of the content of the bin.

The directional information is obtaining by using different combinations of transceiver arrays to transmit acoustic pulses and receive echoes and/or fringes.

One or more acoustic transceiver arrays may function at any given point of time as transmitters and may emit a pulse of acoustic energy (acoustic pulse) 56 towards the upper surface (101(1), 101(2) and 101(3)) of content 80 of silo 100.

FIG. 1 illustrates that all acoustic transceiver arrays 70', 90', 60' and 80' transmit in parallel acoustic pulses 56 that are represented symbolically in FIG. 1 as arrows emerging from acoustic transceiver arrays 70', 90', 60' and 80' respectively and form interference patterns due to overlap between fields of views 170, 190, 160 and 180 respectively. Fringes and echoes from single illuminated areas (6, 7, and 9) are denoted 56 and may be detected by transceivers 70, 80, 60 and 90 of acoustic detection systems 11-13. These fringes and/or echoes are represented in FIG. 1 by dashed arrows 58. In FIG. 2 the acoustic pulse emerges from acoustic transceiver 60 and echoes are reflected back towards acoustic transceivers 60, 70 and 80 of acoustic detection systems 10-12.

The detection of echoes and/or fringes depend upon the field of view of the different acoustic transceiver arrays and on the spatial and reflection characteristic of the area of the upper surface of the content that is illuminated by the acoustic pulse.

Echo and/or fringe 58 is detected by acoustic transceiver arrays 70', 90', 60' and 80' functioning as receivers that in turn are capable of generating detection signals representative of the shape of the upper surface (101(1), 101(2), and 101(3)) of content 80 at three points in time.

The detection signals may be responsive to the time of arrival of the echo/fringe, relationships between time of arrival of the echo to different transceiver arrays, and the spatial arrangement of the acoustic transceiver arrays.

It is noted that transmitter 40 is arranged to direct radiation pulses towards an interior of the bin at different points of time during an content changing process selected out of an emptying process of the content and a filling process of the content; receiver 50 is arranged to receive echoes of the radiation pulses and/or fringes and to generate detection signals that are indicative of a time of arrival and of a direction of arrival of the echoes.

Figure 5:
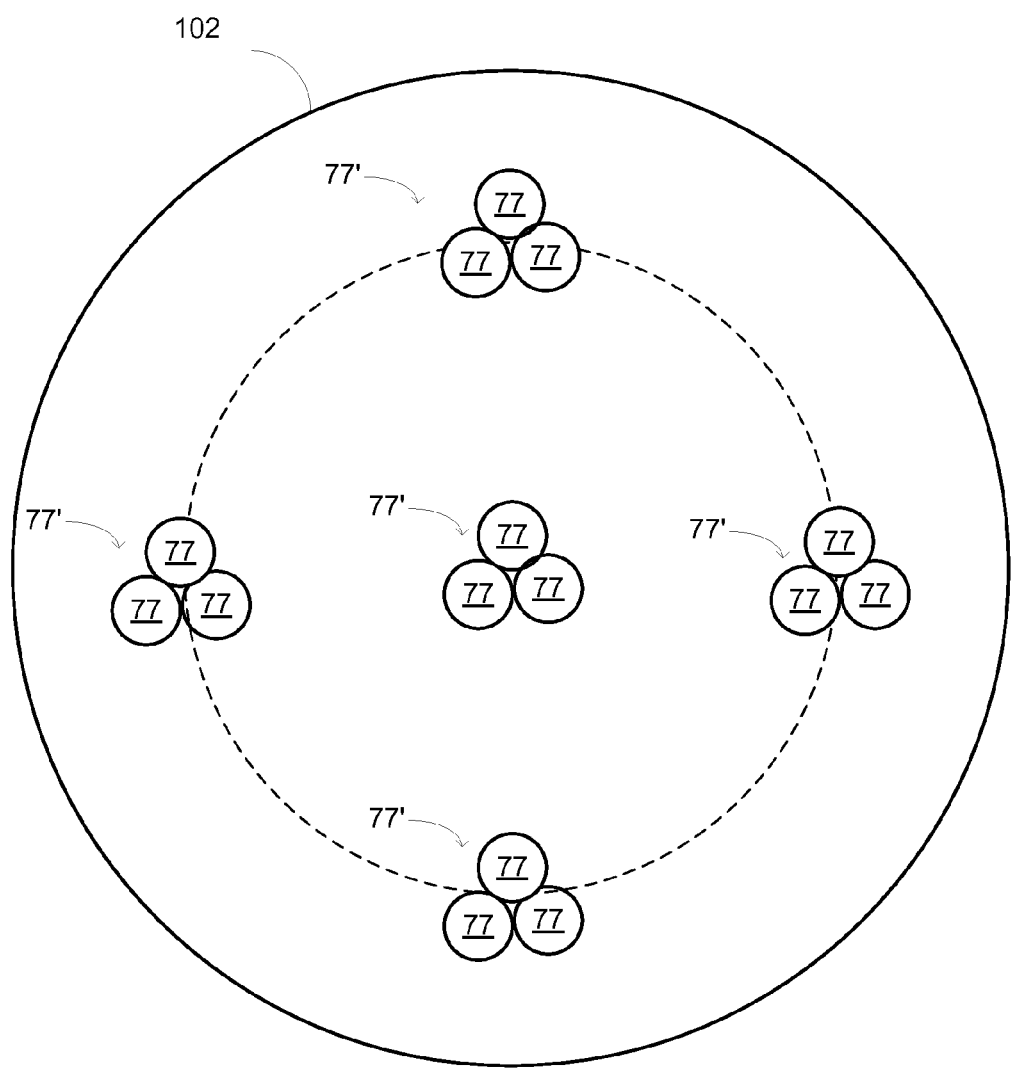
FIG. 5 is a top view of a silo and multiple acoustic transceiver arrays of system mounted on the ceiling of the silo according to an embodiment of the invention.
Figure 6:
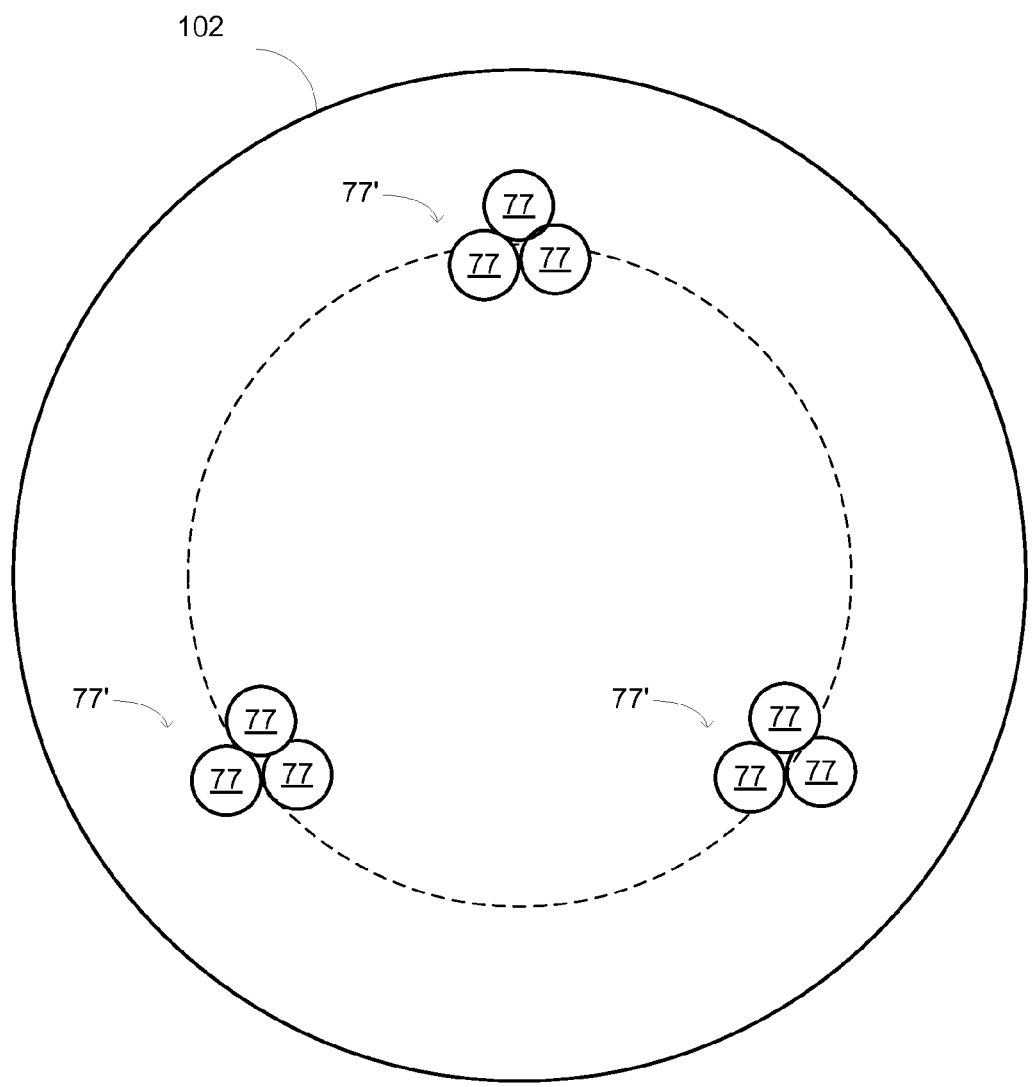
FIG. 6 is a top view of a silo and multiple acoustic transceiver arrays of system mounted on the ceiling of the silo according to an embodiment of the invention.
Figure 7:
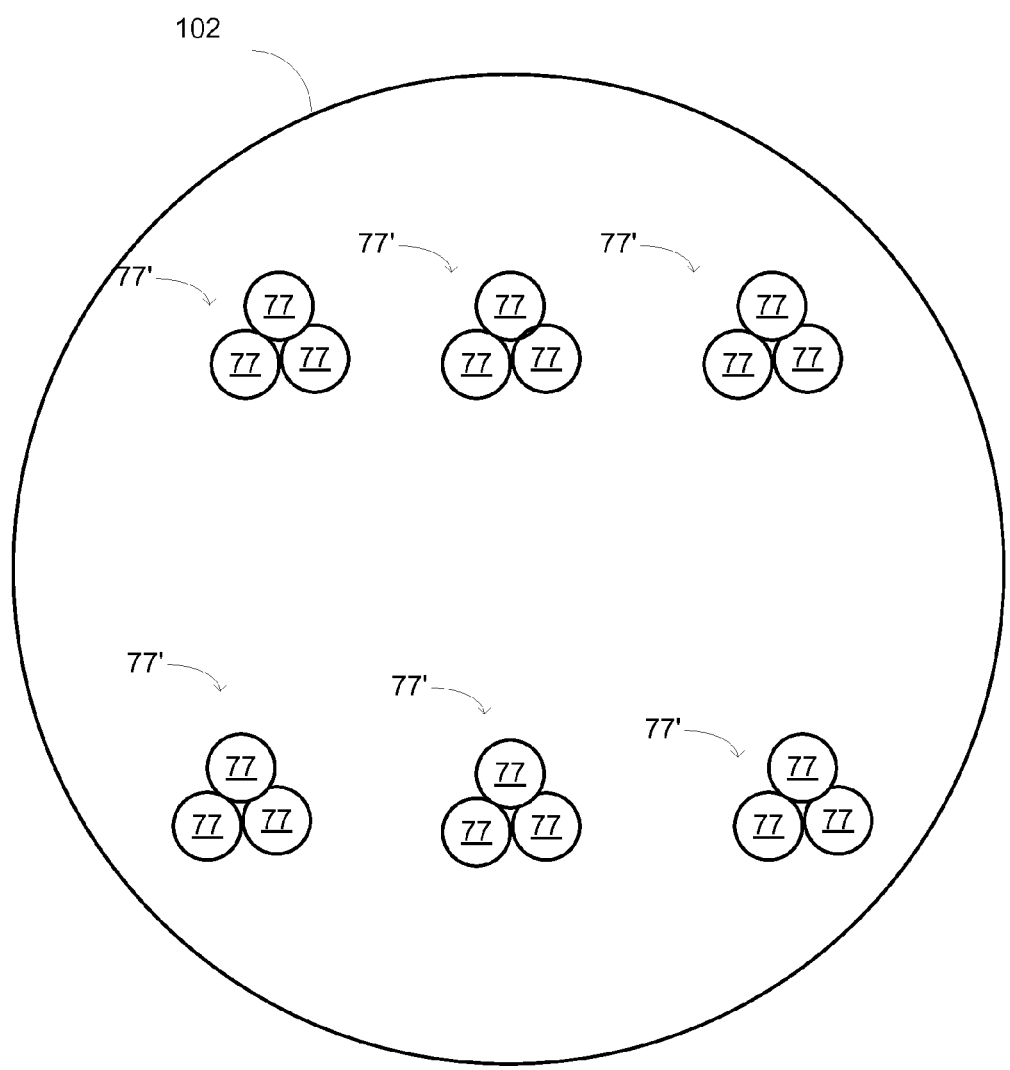
FIG. 7 is a top view of a silo and multiple acoustic transceiver arrays of system mounted on the ceiling of the silo according to an embodiment of the invention.

FIGS. 5-7 are top views of a silo and multiple acoustic transceiver arrays of system mounted on the ceiling of the silo according to various embodiment of the invention.

FIG. 5 illustrates five spaced apart acoustic transceiver arrays 77' each including three acoustic transceivers 77—one being positioned at a center of the silo 100 and four other acoustic transceiver arrays 77 are arranged at a fixed distance from the center of the silo in a symmetrical manner.

FIG. 6 illustrates three spaced apart acoustic transceiver arrays 77' that are positioned at a fixed distance from the center of the silo in a symmetrical manner.

FIG. 7 illustrates six spaced apart acoustic transceiver arrays 77' that are positioned in two rows.

Figure 8:
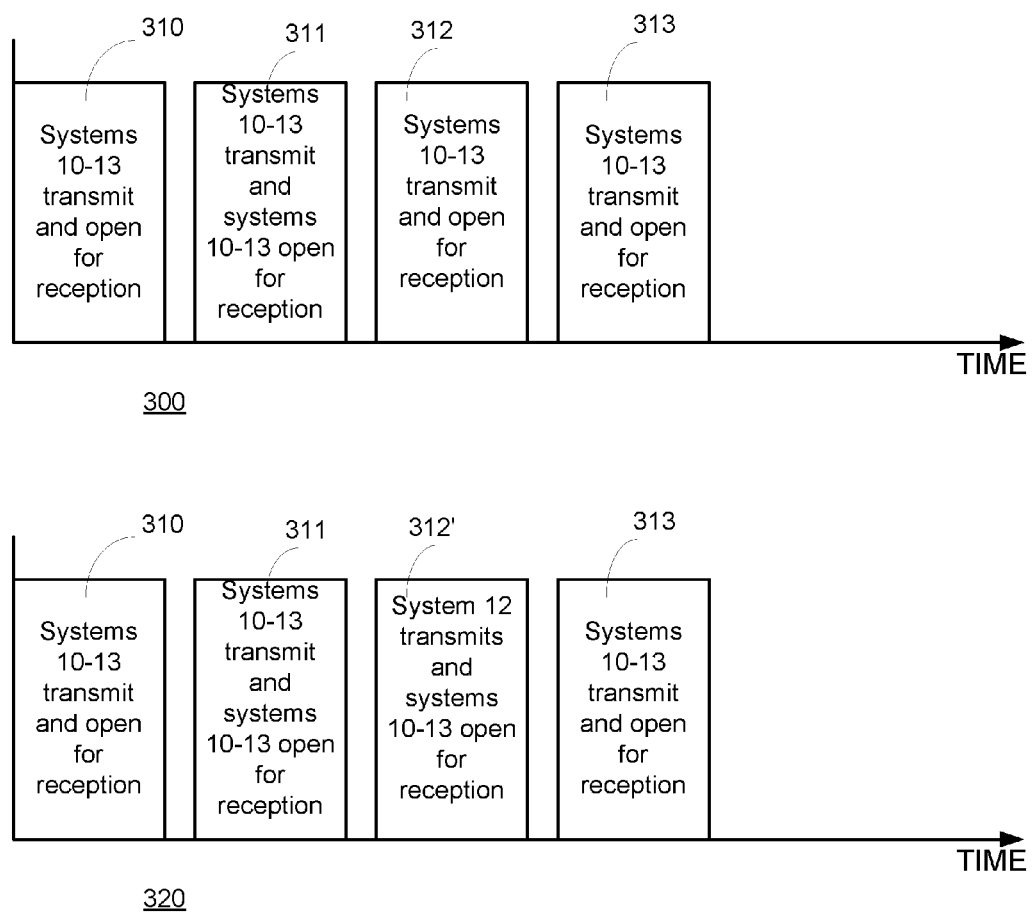
FIG. 8 is a timing diagram according to an embodiment of the invention.

FIG. 8 illustrates two timing diagrams 300 and 320 according to various embodiments of the invention.

Timing diagram 300 illustrates four time slots 310, 311, 312 and 313 during which all the acoustic transceiver arrays transmit acoustic pulses in an at least partially overlapping manner.

Timing diagram 320 illustrates a change between a fully parallel operational mode (time slots 310, 311 and 313) and a single transmission operational mode (time slot 312').

During the single transmission operational mode (time slot 312') only one detection system transmits an acoustic pulse while all detection systems are open for receiving echoes of that acoustic pulse. It is noted that during one or more time slots only a part of the detection systems can be open for reception. During the fully parallel operational modes all of the acoustic transceiver arrays transmit in parallel.

The order of transmission and the jumping between different operational modes can change over time and may differ from the order illustrated in FIG. 8. The time slots can be evenly or unevenly distributed between the acoustic transceiver arrays.

Figure 9:
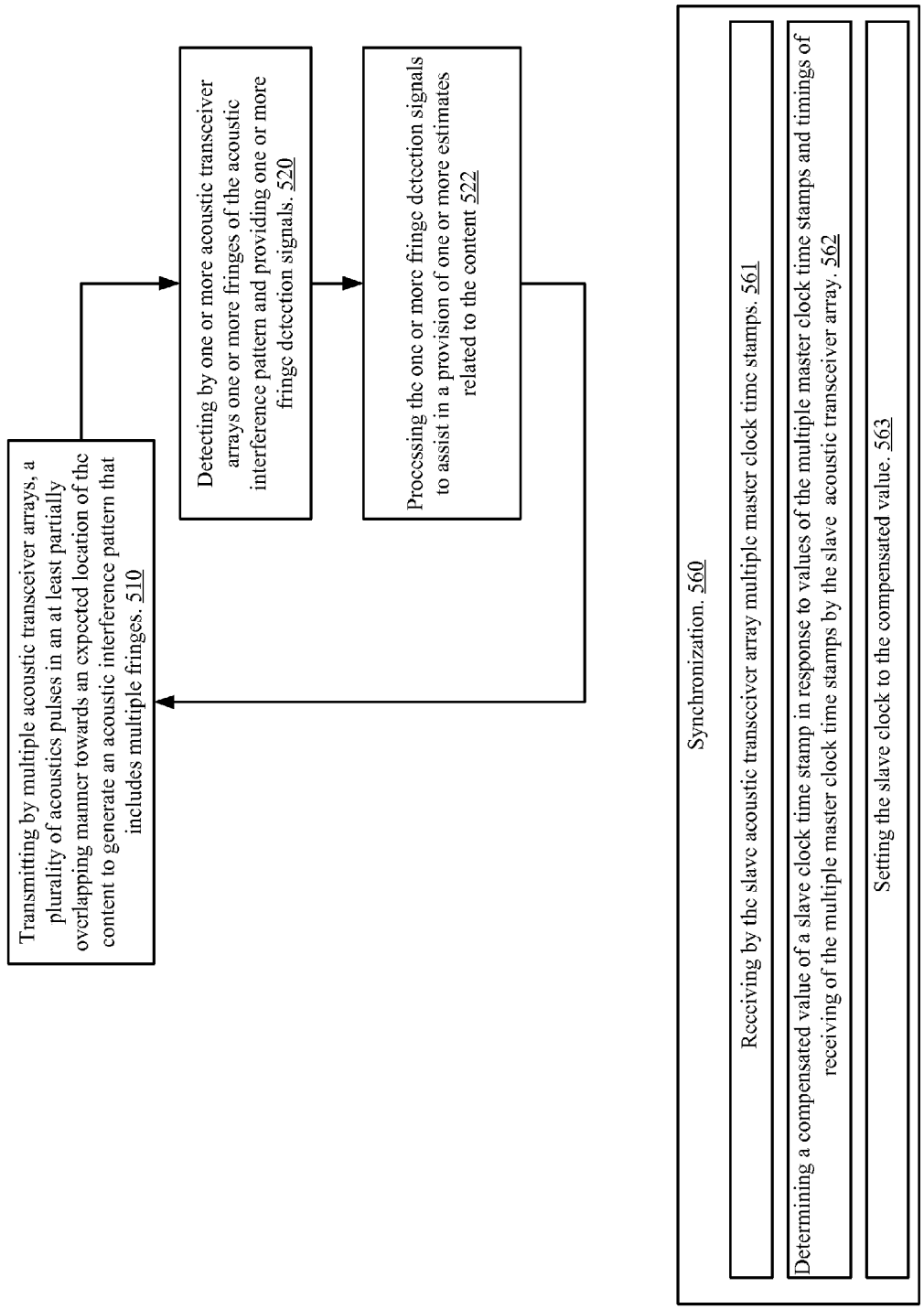
FIG. 9 illustrates a method according to an embodiment of the invention.

FIG. 9 illustrates method 500 according to an embodiment of the invention.

Method 500 may start by stage 510 of transmitting by multiple acoustic transceiver arrays, a plurality of acoustics pulses in an at least partially overlapping manner towards an expected location of the content to generate an acoustic interference pattern that includes multiple fringes.

An upper surface of the content may be expected to be located within a far field of each one of the acoustic transceiver arrays.

Each acoustic pulse may have a shape of a lobe that is more that forty degrees wide.

Stage 510 may be followed by stage 520.

Stage 520 includes detecting by one or more acoustic transceiver arrays one or more fringes of the acoustic interference pattern and providing one or more fringe detection signals.

Stage 520 may be followed by stage 522 of processing the one or more fringe detection signals to assist in a provision of one or more estimates related to the content.

A distance between a pair of acoustic transceiver arrays is at least ten times a distance between transducers of a same acoustic transceiver array.

Stage 532 may be followed by stage 510.

Once for one or more iterations of stages 510 and 520 the method can perform a timing calibration process—which is represented by synchronization stage 560. In order to facilitate the parallel transmission of acoustic pulses by different acoustic transceiver arrays the different acoustic transceiver arrays should be at least partially synchronized. Time mismatches should be reduced in order to facilitate an efficient transmission of pulses—without lengthy acoustic pulses.

The synchronization stage 560 can include synchronizing one or more clocks of one or more acoustic transceiver arrays to a master clock. The master clock can be a clock of one of the acoustic transceiver arrays or a clock of another entity such as a controller that controls the acoustic transceiver arrays.

A slave acoustic transceiver array that executes stage 560 may execute the following stages:
 a. Receiving (561) by the slave acoustic transceiver array multiple master clock time stamps.
 b. Determining (562) a compensated value of a slave clock time stamp (of a slave clock of the slave acoustic transceiver array) in response to values of the multiple master clock time stamps and timings of receiving of the multiple master clock time stamps by the slave acoustic transceiver array; and
 c. Setting (563) the slave clock to the compensated value.

The compensating may include calculating by the certain acoustic transceiver array a gap between a rate of the slave clock and a rate of the master clock in response to the multiple master clock time stamps and in response to the timings of the receiving of the multiple master clock stamps.

For a non-limiting example, the time gaps allowed between clocks of different acoustic transceiver arrays can be about five microseconds and the clock accuracy of each acoustic transceiver array may be about 100 ppm—i.e. up to 100 microseconds drift per second. One per few minutes a master can broadcast master time stamps to all acoustic transceiver arrays. The transmission can be made by wire or wireless means. For example, it can be made using a RS485 multidrop protocol that connects all the acoustic detection devices.

Definitions $CM(t[n])$—the master clock at time $t[n]$ ($n=0, 1, 2, \ldots$)
$CS(t[n])$—the slave clock at time $t[n]$
The slave correction to the master clock at time $t[n]$ is given by:

$$C1=CM(t[n])-CS(t[n])$$

The slave estimation of its clock drift relatively to the Master clock is:

$$C2=((CM(t[n])-CS(t[n]))-(CM(t[n-1])-CS(t[n-1])))/(t[n]-t[n-1])$$

The slave clock compensation value $CM(t')$ (Executed at slave clock timestamp $t'>t[n]$, assuming $t[n]$ is the last received transmission from master prior to $t[n]$) will be given by:

$$CM(t')\sim CS(t')+C1+C2*(t'-t[n])$$

Figure 10:
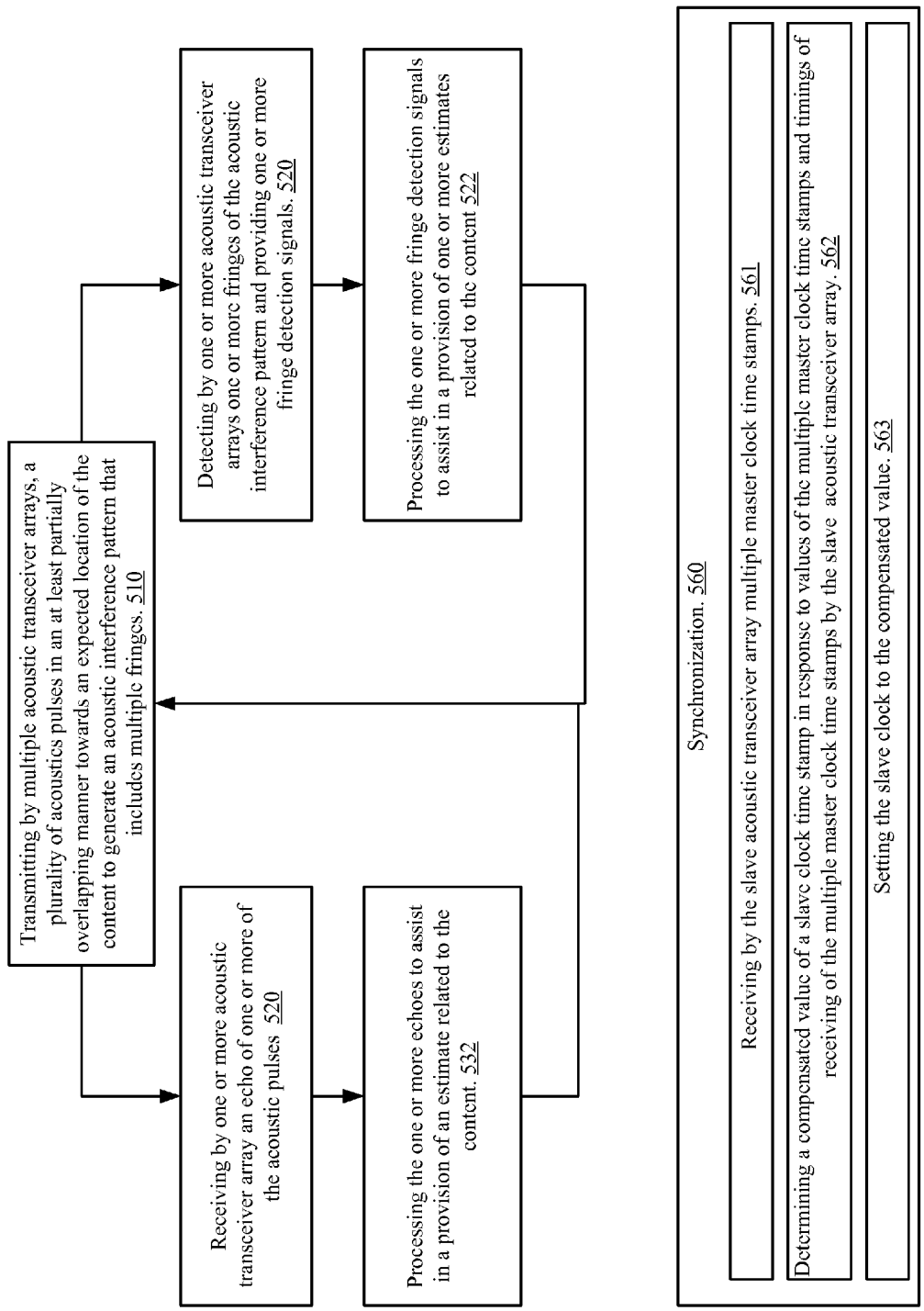
FIGS. 10, 11 and 12 methods according to various embodiments of the invention.

FIG. 10 illustrates method 502 according to an embodiment of the invention.

Method 502 differs from method 500 by including stage 530 and 532.

Stage 510 is followed by stage 520 and 530. Stage 530 is followed by stage 532 that in turn is followed by stage 510.

Stage 530 may include receiving by one or more acoustic transceiver array an echo of one or more of the acoustic pulses.

Stage 530 may be followed by stage 532 of processing the one or more echoes to assist in a provision of an estimate related to the content.

Multiple Modes

The system can change its operational mode—by changing the number of acoustic transceiver arrays that transmit in parallel acoustic pulses. The modes can range between a fully parallel transmission mode (for example execution of methods 500 or 502 where all acoustic transceiver arrays transmit in parallel acoustic pulses), partially parallel transmission mode (for example execution of methods 500 or 502 where some but not all of acoustic transceiver arrays transmit in parallel acoustic pulses) and a single transmission mode in which only up to one acoustic transceiver array is allowed to transmit an acoustic pulse at each given moment.

Figure 11:
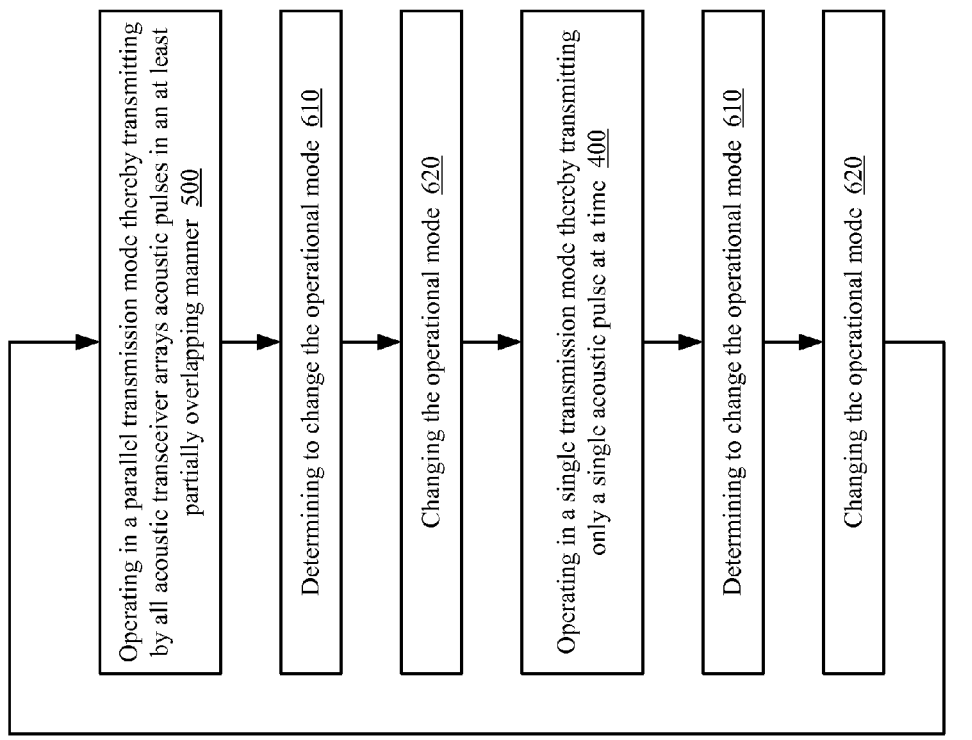

FIG. 11 illustrates a method for hybrid monitoring of a content of a bin according to an embodiment of the invention.

For brevity of explanation the method described switching between a fully parallel transmission mode (stage 500) and a single transmission mode (stage 400), although the method may include switching between additional or other modes such as one or more partial parallel transmission modes.

Stage 500 is followed by stage 610 of determining to change the operational mode of the system, changing (620) the operational mode and then operating (400) at a single transmission mode.

Stage 400 is followed by stage 612 of determining to change the operational mode of the system, changing (622) the operational mode and then operating (400) at a fully parallel transmission mode.

The determining to switch to the single transmission mode can be made if determining that a signal to noise ratio that can be obtained by transmitting acoustic pulses by only a part of the multiple acoustic transceiver arrays exceeds a minimum signal to noise ratio.

Single Transmission Mode

Figure 12:
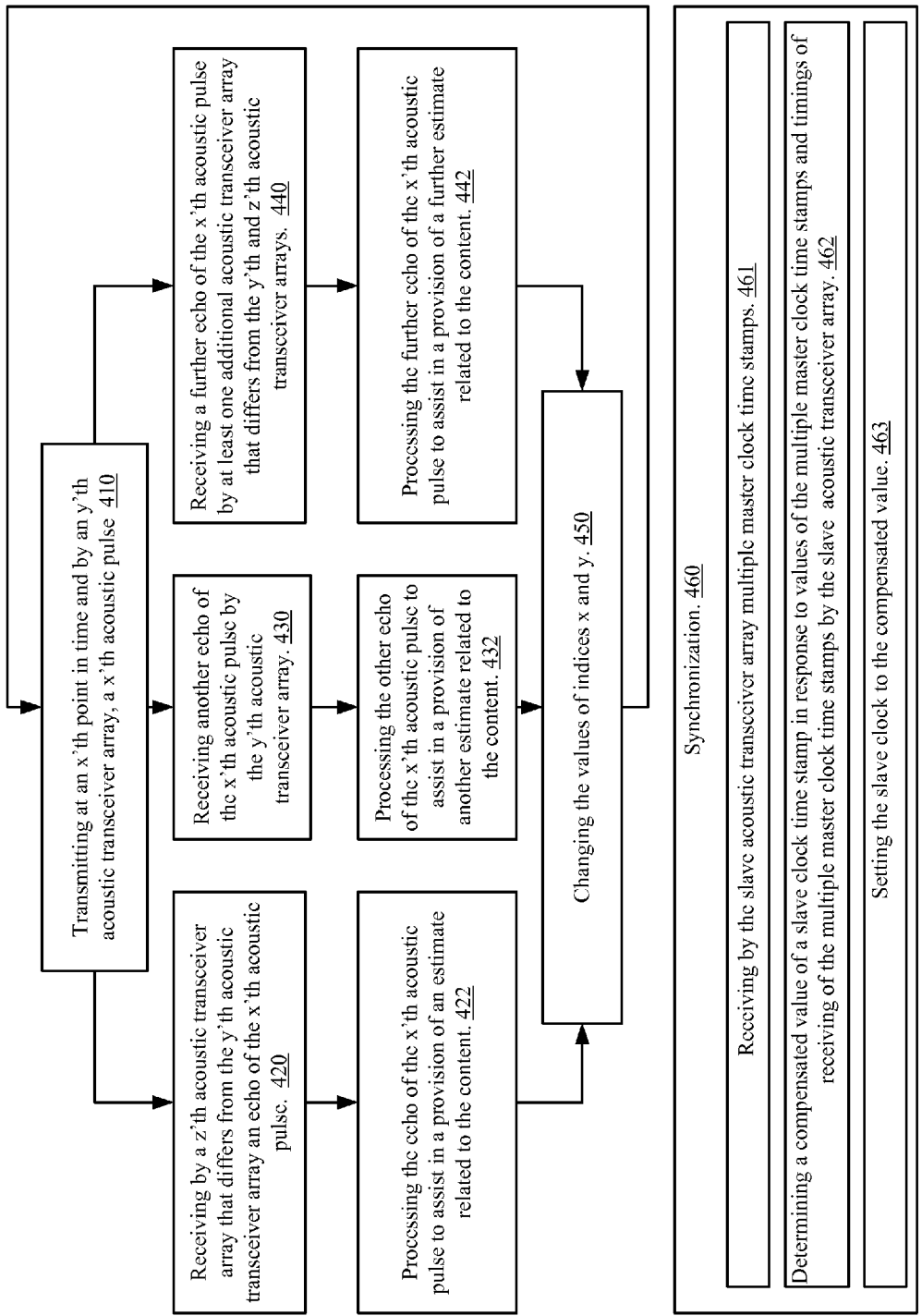

FIG. 12 illustrates method 400 according to an embodiment of the invention.

The following method describes sequences that includes a transmission of an acoustic pulse by a single acoustic transceiver array and a reception (or at least an attempt of reception) of echoes of that acoustic pulse. It is expected that multiple echoes are received. The processing of the echoes can provide an estimate relating to the content of the bin. This estimate can be an estimate of a certain area or point of the upper surface of the content of the bin, can be an estimate of a presence of an obstacle (see, for example obstacle 101 of FIG. 1), can be an estimate of multiple areas and/or multiple points of the upper surface of the bin, a mapping of the upper surface of the bin and even the volume of the content. Typically the estimate of the content of the bin requires multiple transmissions of multiple acoustic pulses over time. The estimates can be provided by each acoustic detection device, by collaboration between multiple acoustic detection devices, by a controller (or any other entity) that receives initial estimates from one or more acoustic detection devices, by collaboration between such a controller and one or more acoustic detection devices.

The following text refers to multiple estimates. These estimates can stand alone, be merged or otherwise further processed to provide a final estimate. A stage of processing an echo may include (a) determining characteristics of the echo (such as degree of arrival, signal to noise ratio, amplitude), (b) determining a location of a reflecting point or area of the surface that reflected the echo, (c) evaluating a reliability level of the estimation of the location of the reflecting point or area, (d) estimating a shape of the content. Each one of the determinations (a)-(d) or any other type of determination can be regarded as an estimate relating to the content.

The determination of a location of a reflecting point that belongs to the upper content of the surface and was reflected an acoustic pulse transmitted from a first acoustic transceiver array and received by a second acoustic transceiver arrays can be based upon geometrical relationships and is determined in response to (a) spatial relationship between the first and second acoustic transceiver arrays, to (ii) a time gap between a transmission of the first acoustic pulse and the reception of the echo of the first acoustic transceiver array, and to (iii) a direction of arrival of the echo to the second acoustic transceiver array. Assuming that the first and second acoustic transceiver arrays and the reflecting points are virtually linked by an imaginary triangle than the first edge E1 virtually links between the first and second acoustic transceiver arrays, the sum (Es) of lengths of the second and third edges E2 and E3 virtually linking the second and first acoustic transceiver arrays to the reflecting point is represented by the time gap (time gap=(E2+E3)/V), wherein V is the propagation velocity of acoustic signals in air, and the angle between E1 and E2 is provided the direction of arrival of the echo.

The relationships between E1, E2, E3 and ALPHA can be given by the following equation, based upon the relationship between angles and edges of the virtual triangle: $E3^2=E2^2-E1^2+2*E1*E2*Cosine(ALPHA)$ Es, ALPHA and E1 are known—Es is calculated in response to the time gap and V, E1 is known as the locations of the first and second acoustic transceiver arrays is known and ALPHA is the angle of transmission of the acoustic pulse from the first acoustic transceiver array and is also known. Accordingly—E3 (the distance between the second transceiver array and the reflecting point) can be extracted:

$$E3^2=(Es-E3)^2-E1^2+2*E1*(Es-E3)*Cosine(ALPHA)$$

Method 400 starts by stage 410 of transmitting at an x'th point in time and by an y'th acoustic transceiver array, an x'th acoustic pulse towards an expected location of the content.

Indices x and y are positive integers. The value of index x is used to represent point in times—and especially denotes transmission time slots (such as 310, 311, 312 and 313). The value of index y ranges between 1 and Y, Y being the number of acoustic transceiver arrays per system (Y equals or exceeds two). The different acoustic transceivers arrays are spaced apart from each other.

Index x can be initialized (during the first iteration of stage 410) to one. Index y is set according to the allocation of time slots to the different acoustic transceiver arrays.

Stage 410 may be followed by one or more of stages 420, 430 and 440.

Stage 420 includes receiving by a z'th acoustic transceiver array that differs from the y'th acoustic transceiver array an echo of the x'th acoustic pulse. Index z ranges between 1 and Y.

Stage 420 may be followed by stage 422 of processing the echo of the x'th acoustic pulse to assist in a provision of an estimate related to the content.

Stage 430 includes receiving another echo of the x'th acoustic pulse by the y'th acoustic transceiver array.

Stage 430 may be followed by stage 432 of processing the other echo of the x'th acoustic pulse to assist in a provision of another estimate related to the content.

Stage 440 includes receiving a further echo of the x'th acoustic pulse by at least one additional acoustic transceiver array that differs from the y'th and z'th acoustic transceiver arrays. Stage 440 may be executed if the system includes more than two acoustic transceiver arrays and if one or more additional acoustic transceivers receives an echo of the x'th acoustic pulse.

Stage 440 may be followed by stage 442 of processing the further echo of the x'th acoustic pulse to assist in a provision of a further estimate related to the content.

Stages 422, 432 and 442 may be followed by stage 450 of changing the values of indices x and y. Index x can be increased by one. Index y is changes to comply with the next acoustic transceiver array that is scheduled to transmit. Stage 450 is followed by stage 410.

Once for one or more iterations of stages 410, 420 and 430 the method can perform a timing calibration process—which is represented by synchronization stage 460. In order to prevent the parallel transmission of acoustic pulses by different acoustic transceiver arrays the different acoustic transceiver arrays should be at least partially synchronized. Time mismatches should be reduced in order to facilitate an efficient transmission of pulses—without lengthy silent periods between transmissions.

The synchronization stage 460 can include synchronizing one or more clocks of one or more acoustic transceiver arrays to a master clock. The master clock can be a clock of one of the acoustic transceiver arrays or a clock of another entity such as a controller that controls the acoustic transceiver arrays.

A slave acoustic transceiver array that executes stage 460 may execute the following stages:
  a. Receiving (461) by the slave acoustic transceiver array multiple master clock time stamps.
  b. Determining (462) a compensated value of a slave clock time stamp (of a slave clock of the slave acoustic transceiver array) in response to values of the multiple master clock time stamps and timings of receiving of the multiple master clock time stamps by the slave acoustic transceiver array; and
  c. Setting (463) the slave clock to the compensated value.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for evaluating a content of a bin, the method comprising:
transmitting by multiple acoustic transceiver arrays that are spaced apart from each other and have partially overlapping fields of views that form an overlap area on a surface of the content, a plurality of acoustics pulses in an at least a partially overlapping manner towards the overlap area to generate, at the overlap area, an acoustic interference pattern that comprises multiple fringes; wherein each acoustic array of the multiple acoustic transceiver arrays comprises transducers;

detecting by an acoustic transceiver array a first fringe of the acoustic interference pattern and providing a fringe detection signal; and processing the first fringe detection signal to assist in a provision of a first estimate related to the content;

wherein a distance between a pair of acoustic transceiver arrays is at least ten times a distance between centers of the transducers of each acoustic transceiver array of the pair of acoustic transceiver arrays.

2. The method according to claim 1 comprising detecting by each one of the multiple acoustic transceiver arrays fringes of the acoustic interference pattern to provide fringe detection signals and processing the fringe detection signals to provide a second estimate related to the content.

3. The method according to claim 1 comprising compensating for clock differences between a second clock of the second acoustic transceiver array and a master clock.

4. The method according to claim 3 wherein the compensating comprises: receiving multiple master clock time stamps; determining a compensated value of an acoustic transceiver array clock time stamp in response to values of the multiple master clock time stamps and timings of receiving of the multiple master clock time stamps; and setting the acoustic transceiver array clock to the compensated value.

5. The method according to claim 4 wherein the compensating comprises calculating by each acoustic transceiver array a gap between a rate of the acoustic transceiver array clock and a rate of the master clock in response to the multiple master clock time stamps and in response to the timings of the receiving of the multiple master clock stamps.

6. The method according to claim 1 wherein an upper surface of the content is expected to be located within a far field of each one of the acoustic transceiver arrays.

7. The method according to claim 1 wherein each acoustic pulse has a shape of a lobe that is more than forty degrees wide.

8. The method according to claim 1 comprising switching, by the system that comprises the multiple acoustic transceiver arrays, to a partial transmission mode during which only a part of the multiple acoustic transceiver arrays transmit acoustics pulses in an at least the partially overlapping manner towards the expected location of the content.

9. The method according to claim 8 comprising determining, by the system, to switch to the partial transmission mode if determining that a signal to noise ratio that can be obtained by transmitting acoustic pulses by only a part of the multiple acoustic transceiver arrays exceeds a minimum signal to noise ratio.

10. A system comprising multiple acoustic transceiver arrays that are spaced apart from each other and have partially overlapping fields of views that form an overlap area on a surface of the content, the multiple acoustic transceiver arrays are arranged to transmit a plurality of acoustics pulses in an at least partially overlapping manner towards the overlap area to generate, at the overlap area, an acoustic interference pattern that comprises multiple fringes; wherein at least one of the acoustic transceiver arrays of the multiple acoustic transceiver arrays is arranged to detect a first fringe of the acoustic interference pattern and providing a fringe detection signal; and process the first fringe detection signal to assist in a provision of a first estimate related to the content; wherein each acoustic array of the multiple acoustic transceiver arrays comprises transducers; wherein a distance between a pair of acoustic transceiver arrays is at least ten times a distance between centers of the transducers of each acoustic transceiver array of the pair of acoustic transceiver arrays.

11. The system according to claim 10 wherein the multiple acoustic transceiver arrays are arranged to detect fringes of the acoustic interference pattern to provide fringe detection signals and to process the fringe detection signals to provide a second estimate related to the content.

12. The system according to claim 10 wherein each acoustic transceiver array is arranged to compensate for clock differences between a clock of the acoustic transceiver array and a master clock.

13. The system according to claim 10 wherein each acoustic transceiver array is arranged to determine a compensated value of an acoustic transceiver array clock time stamp in response to values of the multiple master clock time stamps and timings of receiving of the multiple master clock time stamps; and set the acoustic transceiver array clock to the compensated value.

14. The system according to claim 13 wherein each acoustic transceiver array is arranged to calculate a gap between a rate of the master clock and a rate of the acoustic transceiver array clock in response to the multiple master clock time stamps and in response to the timings of the receiving of the multiple master clock stamps.

15. The system according to claim 10 wherein an upper surface of the content is expected to be located within a far field of each one of the acoustic transceiver arrays.

16. The system according to claim 10 wherein each acoustic pulse has a shape of a lobe that is more than forty degrees wide.

17. The system according to claim 10 wherein each acoustic transceiver array is arranged to switch, in response to a determination made by the system, to a partial transmission mode during which only a part of the multiple acoustic transceiver arrays transmit acoustics pulses in an at least the partially overlapping manner towards the expected location of the content.

18. The system according to claim 17 wherein at least one acoustic transceiver array is arranged to determine to switch to the partial transmission mode if a signal to noise ratio that can be obtained by transmitting acoustic pulses by only a part of the multiple acoustic transceiver arrays exceeds a minimum signal to noise ratio.

19. The system according to claim 11 comprising a controller that is arranged to receive the first and second estimates related to the content and to provide an updated estimate related to the content.

20. The method according to claim 1 wherein the multiple acoustic transceiver arrays have optical axes that are oriented to each other.

* * * * *